US010926252B2

(12) United States Patent
Wang et al.

(10) Patent No.: US 10,926,252 B2
(45) Date of Patent: Feb. 23, 2021

(54) PLASMONIC NANOPARTICLE CATALYSTS AND METHODS FOR PRODUCING LONG-CHAIN HYDROCARBON MOLECULES

(71) Applicant: Beijing Guanghe New Energy Technology Co., Ltd., Beijing (CN)

(72) Inventors: Cong Wang, Beijing (CN); Haizhou Ren, Gansu (CN)

(73) Assignee: Beijing Guanghe New Energy Technology Co., Ltd., Beijing (CN)

( * ) Notice: Subject to any disclaimer, the term of this patent is extended or adjusted under 35 U.S.C. 154(b) by 0 days.

(21) Appl. No.: 16/570,073

(22) Filed: Sep. 13, 2019

(65) Prior Publication Data

US 2020/0023345 A1 Jan. 23, 2020

Related U.S. Application Data

(62) Division of application No. 16/069,023, filed as application No. PCT/CN2016/070580 on Jan. 11, 2016.

(51) Int. Cl.
*B01J 35/00* (2006.01)
*C10G 2/00* (2006.01)
(Continued)

(52) U.S. Cl.
CPC ............ *B01J 35/004* (2013.01); *B01J 19/127* (2013.01); *B01J 23/75* (2013.01); *B01J 35/0013* (2013.01);
(Continued)

(58) Field of Classification Search
CPC ...... B01J 35/004; B01J 35/023; B01J 35/026; B01J 35/08; B01J 2523/18; B01J 2523/19;
(Continued)

(56) References Cited

U.S. PATENT DOCUMENTS

2005/0215737 A1 9/2005 Dharmarajan et al.
2010/0213046 A1 8/2010 Grimes et al.
(Continued)

FOREIGN PATENT DOCUMENTS

CN 104785259 A 7/2015
WO 2011/146714 11/2011
(Continued)

OTHER PUBLICATIONS

Hailong Li et al., "Enhanced selective photocatalytic reduction of CO2 to CH4 over plasmonic Au modified g-C3N4 photocatalyst under UV-vis light irradiation." Applied Surface Science 439, pp. 552-559. (Year: 2018).*
E. Kowalska et al., "Mono- and bi-metallic plasmonic photocatalysts for degradation of organic compounds under UV and visible light irradiation." Catalysis Today 230, pp. 131-137. (Year: 2014).*
(Continued)

*Primary Examiner* — Patricia L. Hailey
(74) *Attorney, Agent, or Firm* — Morgan, Lewis & Bockius LLP

(57) ABSTRACT

A plasmonic nanoparticle catalyst for producing hydrocarbon molecules by light irradiation, which comprises at least one plasmonic provider and at least one catalytic property provider, wherein the plasmonic provider and the catalytic property provider are in contact with each other or have distance less than 200 nm, and molecular composition of the hydrocarbon molecules produced by light irradiation is temperature-dependent. And a method for producing hydrocarbon molecules by light irradiation utilizing the plasmonic nanoparticle catalyst.

13 Claims, 3 Drawing Sheets

(51) Int. Cl.
  *B01J 23/75* (2006.01)
  *B01J 19/12* (2006.01)
  *B01J 35/02* (2006.01)
  *B01J 35/08* (2006.01)
  *B82Y 30/00* (2011.01)
  *B82Y 40/00* (2011.01)

(52) U.S. Cl.
  CPC ........... *B01J 35/023* (2013.01); *B01J 35/026* (2013.01); *B01J 35/08* (2013.01); *C10G 2/00* (2013.01); *C10G 2/33* (2013.01); *C10G 2/331* (2013.01); *C10G 2/332* (2013.01); *C10G 2/333* (2013.01); *C10G 2/50* (2013.01); *B01J 2523/18* (2013.01); *B01J 2523/19* (2013.01); *B01J 2523/31* (2013.01); *B01J 2523/47* (2013.01); *B01J 2523/828* (2013.01); *B01J 2523/842* (2013.01); *B01J 2523/845* (2013.01); *B01J 2523/847* (2013.01); *B82Y 30/00* (2013.01); *B82Y 40/00* (2013.01); *C10G 2300/70* (2013.01); *C10G 2400/28* (2013.01)

(58) Field of Classification Search
  CPC ................ B01J 2523/31; B01J 2523/47; B01J 2523/828; B01J 2523/842; B01J 2523/845; B01J 2523/847
  USPC ..................... 502/326, 329–331, 334, 350
  See application file for complete search history.

(56) References Cited

U.S. PATENT DOCUMENTS

2013/0168228 A1 7/2013 Ozin et al.
2015/0151281 A1 6/2015 Huang et al.
2016/0340593 A1 11/2016 Frederick MacDonnell et al.
2019/0002364 A1 1/2019 Metha et al.

FOREIGN PATENT DOCUMENTS

WO 2011/146714 A3 3/2012
WO 2014/169258 * 10/2014 .............. B01J 35/00
WO 2015/109217 * 7/2015 .............. C07C 1/02

OTHER PUBLICATIONS

Ewa Kowalska et al., "Hybrid photocatalysts composed of titania modified with plasmonic nanoparticles and ruthenium complexes for decomposition of organic compounds." Applied Catalysis B: Environmental 178, pp. 133-143. (Year: 2015).*
Juergem Biener et al., "Nanporous Plasmonic Metannaterials." Advanced Materials 20, pp. 1211-1217. (Year: 2008).*
Cong Wang et al., "Using metal nanostructures to form hydrocarbons from carbon dioxide, water and sunlight." AIP Advances 1, pp. 042124-1 to 042124-8. (Year: 2011).*
Wenbo Hou et al., "Photocatalytic Conversion of CO2 to Hydrocarbon Fuels via Plasmon-Enhanced Absorption and Metallic Interband Transitions." ACS Catalysis, 1, pp. 929-936. (Year: 2011).*
Bijith D. Mankady et al., "Photo-conversion of CO2 using titanium dioxide: enhancements by plasmonic and co-catalytic nanoparticles." Nanotechnology 24, pp. 405402-1 to 405402-8. (Year: 2013).*
International Search Report issued in corresponding International Patent Application No. PCT/CN2016/070580 dated Sep. 30, 2016.
Written Opinion issued in corresponding International Patent Application No. PCT/CN2016/070580 dated Sep. 30, 2016.
Examination Report issued in corresponding Australian Patent Application No. 2016386603 dated Apr. 17, 2020.
Examination Report issued in corresponding Australian Patent Application No. 2016386603 dated May 17, 2019.

* cited by examiner

PLASMONIC NANOPARTICLE CATALYSTS AND METHODS FOR PRODUCING LONG-CHAIN HYDROCARBON MOLECULES

FIELD OF THE INVENTION

The invention generally relates to carbon dioxide sequestration and renewable energy. More particularly, the invention generally relates to plasmonic nanoparticle catalysts and methods for producing long-chain hydrocarbon molecules.

BACKGROUND

In the past few decades, there has been growing interest in the field of conversion of solar energy into a more usable form of energy. Some technologies have shown great promise in this area but are still long way from commercialization. Most efforts so far have only been successful in producing short-chain ($C_1$-$C_2$) hydrocarbons or carbohydrates, and the solar-to-chemical efficiencies are 1 or 2 orders of magnitude lower than natural photosynthesis, of which the efficiency is typically 1~7%.

SUMMARY OF THE INVENTION

Herein, the inventors have demonstrated a novel artificial photosynthesis technology which provided a unique catalyst and method for producing long-chain hydrocarbon molecules by utilizing CO or $CO_2$ from industrial flue gas or atmosphere.

One aspect of the present invention is a plasmonic nanoparticle catalyst for producing hydrocarbon molecules by light irradiation, which comprises at least one plasmonic provider; and at least one catalytic property provider, wherein the plasmonic provider and the catalytic property provider are in contact with each other or have distance less than 200 nm, and molecular composition of the hydrocarbon molecules produced by light irradiation is temperature-dependent.

In certain embodiments, said at least one plasmonic provider and said at least one catalytic property provider of the plasmonic nanoparticle catalyst are provided in one nanoparticle, and said nanoparticle comprises one chemical element as both the plasmonic provider and the catalytic property provider, or alloy of two or more chemical elements each as the plasmonic provider or the catalytic property provider.

In preferred embodiments, the plasmonic provider of the plasmonic nanoparticle catalyst is selected from Co, Fe, Al, Ag, Au, Pt, Cu, Ni, Zn, Ti, C and alloys of two or more chemical elements thereof.

In preferred embodiments, the catalytic property provider of the plasmonic nanoparticle catalyst is selected from Co, Fe, Ru, Rh, Pd, Os, Ir, La, Ce, Cu, Ni, Ti,C and oxide, chloride, carbonate and bicarbonate thereof.

In certain embodiments, the dimension of the plasmonic nanoparticle is about 1 nm to about 1000 nm in length, width and height; the shape of the plasmonic nanoparticle catalyst is spherical, cylindrical, polyhedral, 3D cones, cuboidal, sheet, hemispherical, irregular 3D shapes, porous structure or any combinations thereof.

In preferred embodiments, solar-to-chemical efficiency of the plasmonic nanoparticle catalyst is more than 10% at temperatures between about 20° C. to about 800° C.

Another aspect of the present invention is a method for producing hydrocarbon molecules by light irradiation, comprising the following steps:

contacting a plasmonic nanoparticle catalyst with at least one carbon-containing source and at least one hydrogen-containing source; and irradiating the plasmonic nanoparticle catalyst, the carbon-containing source and the hydrogen-containing source with light to produce hydrocarbon molecules.

The plasmonic nanoparticle catalyst of above one aspect could be utilized in such method.

In certain embodiments, the light irradiation step is performed under a temperature between about 20° C. to about 800° C., about 30° C. to about 300° C., about 50° C. to about 250° C., about 70° C. to about 200° C., about 80° C. to about 180° C., about 100° C. to about 150° C., about 110° C. to about 130° C., etc. Solar-to-chemical efficiency is more than 10% at above mentioned temperatures.

In specific embodiments, the light irradiation is performed under a temperature between about 20° C. to about 200° C., and the main composition of hydrocarbon molecules produced by light irradiation are straight chain saturated hydrocarbons.

In specific embodiments, the light irradiation is performed under a temperature between about 200° C. to about 300° C., and the main composition of hydrocarbon molecules produced by light irradiation are aromatic hydrocarbons.

In specific embodiments, the light irradiation is performed under a temperature between about 300° C. to about 800° C., and the main composition of hydrocarbon molecules produced by light irradiation are unsaturated branched hydrocarbons.

In certain embodiments, the light irradiation raises the temperature of the plasmonic nanoparticle catalyst, the carbon-containing source and the hydrogen-containing source. In certain embodiments, the temperature of the plasmonic nanoparticle catalyst, the carbon-containing source and the hydrogen-containing source is solely raised by the light irradiation.

In preferred embodiments, the carbon-containing source comprises $CO_2$ or CO; the hydrogen-containing source comprises water.

DETAILED DESCRIPTION

Figure 1A:
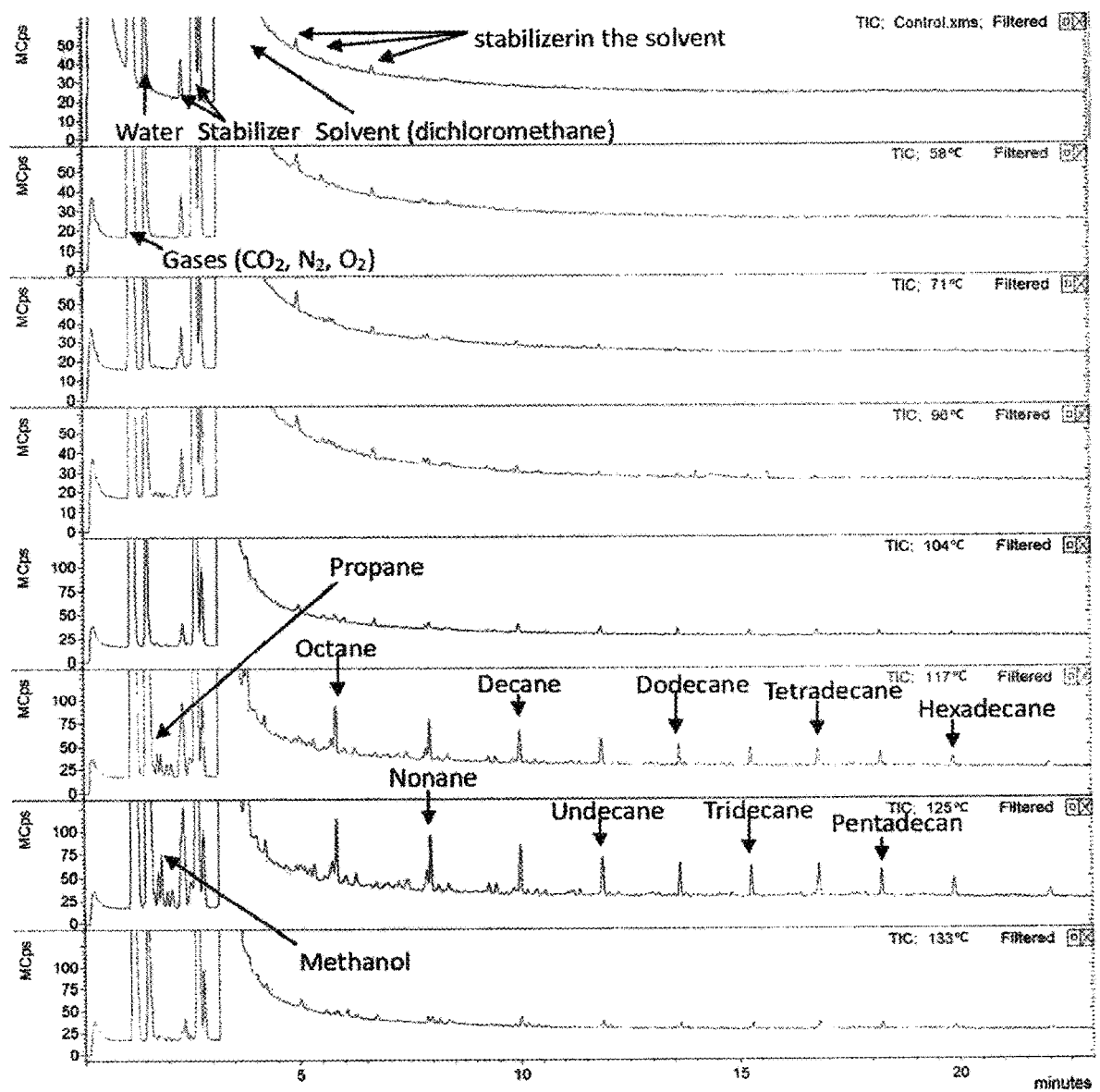
FIG. 1A-1B. GC analysis of products obtained at different temperatures.

The invention demonstrated that plasmonic nanoparticle catalyst of the present invention can be used as catalysts to convert $CO_2$ (or CO) and water to various long-chain hydrocarbon molecules using sunlight as the only energy input at a quantum leap in efficiency. Recorded solar-to-chemical efficiency of this reaction was measured at 10% to 20% peak, and >20% peak solar-to-chemical efficiency could be achieved in theory.

Before further description of the present invention, certain terms employed in the specification, examples and appended claims are collected together in the following section.

Definitions

The definitions listed herein should be read in light of the remainder of the disclosure and understood as by a person of skill in the art. Unless defined otherwise, all technical and scientific terms used herein have the same meaning as commonly understood by a person of ordinary skill in the art to which this invention belongs.

The term "nanoparticle" used herein refers to particles having dimensions within nanometer range, i.e. 1 nm to 1000 nm in length, width, and height. Nanoparticles may exhibit size-related properties that differ significantly from those observed in bulk materials. In certain cases, Tubes and fibers with only two dimensions within nanometer range are also considered as nanoparticles.

The term "catalyst" used herein refers to substances that exhibit effects to increase the rate of a chemical reaction by reducing the activation energy of the reaction. The rate increasing effect is referred as "catalysis". Catalysts are not consumed in the catalyzed reaction, therefore they can continue to catalyze the reaction of further quantities of reactant with a small amount.

The term "plasmonic provider" used herein refers to conductor whose real part of dielectric constant thereof is negative. Plasmonic providers provide surface plasmons when excited by electromagnetic irradiation.

The term "temperature-dependent" used herein refers to properties that may vary when temperature changes by a given level. The temperature difference to alter the property may be any degrees, such as 0.1° C., 1° C., 5° C., 10° C., 100° C., or 1000° C.

The term "chemical element" used herein refers to chemical substance consisting of atoms having the same number of protons in their atomic nuclei. Specifically, chemical elements are those recorded in the periodic table of chemical elements. Chemical elements included natural elements and synthetic elements. Chemical element also included elements not discovered yet with more than 118 protons in the atomic nuclei.

The term "alloy" used herein refers to a mixture of metals or a mixture of metal and other elements. Alloys are defined by metallic bonding character. An alloy may be a solid solution of metal elements (a single phase) or a mixture of metallic phases (two or more phases).

Plasmonic Nanoparticle Catalysts

One aspect of the present invention is a plasmonic nanoparticle catalyst. The size range of the plasmonic nanoparticles is 1-1000 nm length, width, and height, therefore the volume is 1 $nm^3$ to 1 $um^3$. The shapes of the plasmonic nanoparticles can be spherical, cylinders, polyhedrons, 3D cones, cuboids, sheets, hemisphere, irregular 3D shapes, porous structure and any combinations thereof.

Based on our experimental results, plasmonic nanoparticle catalysts having a size within the range of 1 nm to 1000 nm have significant higher solar-to-chemical efficiency (10-20%) than micron-sized catalysts, such as catalysts have a size of 100 um in diameter (1-10%).

The plasmonic nanoparticles have two components. One component is plasmonic provider, and the other component is catalytic property provider. Plasmonic provider provides surface plasmon resonance enhancement to the localized field on catalysts. Catalytic property provider provides catalytic property to the reaction that produces hydrocarbons. In the plasmonic nanoparticle catalysts, the plasmonic provider and the catalytic property provider are in contact with each other or have distance less than 200 nm. If the distance between the plasmonic provider and the catalytic property provider are outside aforementioned range, two kinds of providers cannot exert the effect in cooperation with each other, thus cannot catalyze the photosynthesis reaction.

Plasmonic provider is a conductor whose real part of its dielectric constant is negative. It can be a pure substance or a mixture, and the composing element is one or more selected from Co, Fe, Al, Ag, Au, Pt, Cu, Ni, Zn, Ti, C and alloys of two or more chemical elements thereof. Different plasmonic providers have different plasmon enhancement strength and active life time. For example, noble metal elements such as Ag, Au and Pt have high plasmon enhancement strength and long active life time. Common metal elements such as Co and Fe have low plasmon enhancement strength and short active life time. For efficiency and cost reasons, Co is preferably used in this invention.

Catalytic property provider can be a pure substance or a mixture, and the composing element is one or more selected from Co, Fe, Ru, Rh, Pd, Os, Ir, La, Ce, Cu, Ni, Ti, C and their oxide, chloride, carbonate and bicarbonate. Different catalytic property providers also have different catalytic strength and active life time. For example, rare earth metal elements such as Ru, Rh and Pd have highest catalytic strength but short active life time. Elements such as Co, Fe, Cu, Ni and their oxides have high to middle catalytic strength. Chlorides or carbonates of aforementioned generally have lower catalytic strength but longer active life time. In this invention, Co and oxides of Co are preferably used.

Plasmonic provider and catalytic property provider can be randomly mixed, or regularly mixed. In preferred embodiments, said at least one plasmonic provider and said at least one catalytic property provider of the plasmonic nanoparticle catalyst are provided in one nanoparticle, and said nanoparticle comprises one chemical element as both the plasmonic provider and the catalytic property provider, or alloy of two or more chemical elements each as the plasmonic provider or the catalytic property provider. Specifically, the plasmonic nanoparticle catalyst could be nanoparticles of aforementioned elements, or nanoparticles of alloys of aforementioned elements, as long as the elements can provide plasmonic property and catalytic property simultaneously.

From above descriptions, it is clearly that certain elements exhibit both plasmonic property and catalytic property. Thus the plasmonic provider and the catalytic property provider of the plasmonic nanoparticle can be a same element, such as Co, Fe, Cu, Ni, C and the like, or the element and its oxide, chloride, carbonate and bicarbonate, such as Co and CoO, Fe and FeO, etc.

Mixture of different elements will modify the property of these plasmonic nanoparticle catalysts. For example, Co/Ag and Co/Au alloy will increase the active life time of the catalysts, and relative short chain hydrocarbons will be mainly produced ($C_3$ to $C_6$). For example, Co/C will only increase the active life time of the catalysts, but do not affect other aspects of the reaction.

The plasmonic nanoparticles can be used as catalyst for producing hydrocarbon molecules by light irradiation, which functions in various states, such as dispersed, congregated, or attached/grew on the surface of other materials.

The plasmonic nanoparticle catalyst have high solar-to-chemical efficiency (more than 10%) at temperatures between about 20° C. to about 800° C., and molecular composition of the hydrocarbon molecules produced by light irradiation is temperature-dependent. For example, at relatively lower temperatures (less than 200° C.), straight saturated hydrocarbons (alkanes) are main product. With temperature further increasing, aromatic hydrocarbons become main products. At higher temperature range, the products are the mixture of alkanes, alkenes, alkynes and aromatic hydrocarbons

Method for Producing Long-Chain Hydrocarbon Molecules

Another aspect of the present invention is a method for producing hydrocarbon molecules by light irradiation, comprising the following steps:

contacting above-described plasmonic nanoparticle catalyst with at least one carbon-containing source and at least one hydrogen-containing source; and irradiate the plasmonic nanoparticle catalyst, the carbon-containing source and the hydrogen-containing source with light to produce hydrocarbon molecules.

The light irradiation initiates a reaction of the carbon-containing source and the hydrogen-containing source with the catalysis of the plasmonic nanoparticle catalyst. Within a certain temperature range, raising the temperature leads to a higher yield of the hydrocarbon molecule products. The hydrocarbon molecule product of the catalyzed reaction is temperature dependent.

The light irradiation step is performed under a temperature between about 20° C. to about 800° C., about 30° C. to about 300° C., about 50° C. to about 250° C., about 70° C. to about 200° C., about 80° C. to about 180° C., about 100° C. to about 150° C., about 110° C. to about 130° C., etc. In order to obtain fuel-like hydrocarbon molecules, the temperature is preferred to be between about 70° C. to about 200° C. Solar-to-chemical efficiency is more than 10% at above mentioned temperatures.

The light irradiation simulates the wavelength composition and intensity of sunlight, therefore it may raise the temperature of the irradiated catalysts and reactants mixture. When the irradiation intensity reaches a certain level, the temperature of the plasmonic nanoparticle catalyst, the carbon-containing source and the hydrogen-containing source is solely raised by the light irradiation.

The reaction period varies based on the size of the reaction, irradiation intensity, temperature and other factors. With a well-established apparatus, the reaction is continuously performed with a continuous feed of the carbon-containing source and the hydrogen-containing source.

EXAMPLES 1-5 g of Cobalt nanoparticles having a size within the range of 1 nm to 1000 nm were sealed in a glass vial with water and $CO_2$. The glass vials was irradiated under sunlight or solar simulator for 8-20 hours at appropriate temperature. The intensity of incident light is about 1000 to 1500 $W/m^2$. Thermal couples were attached to the bottom half of the vial to monitor the temperature. A control experiment was also conducted with the same material but without light irradiation to show that there are no contaminations from the precursor.

After 8-20 hours of irradiation, the products were extracted with 1 mL of dichloromethane and analyzed by a gas chromatography-mass spectrometer (GC-MS) with identical route. The amount of each compound was calibrated with a standard $C_7$-$C_{20}$ alkane sample solved in hexane.

Figure 1B:
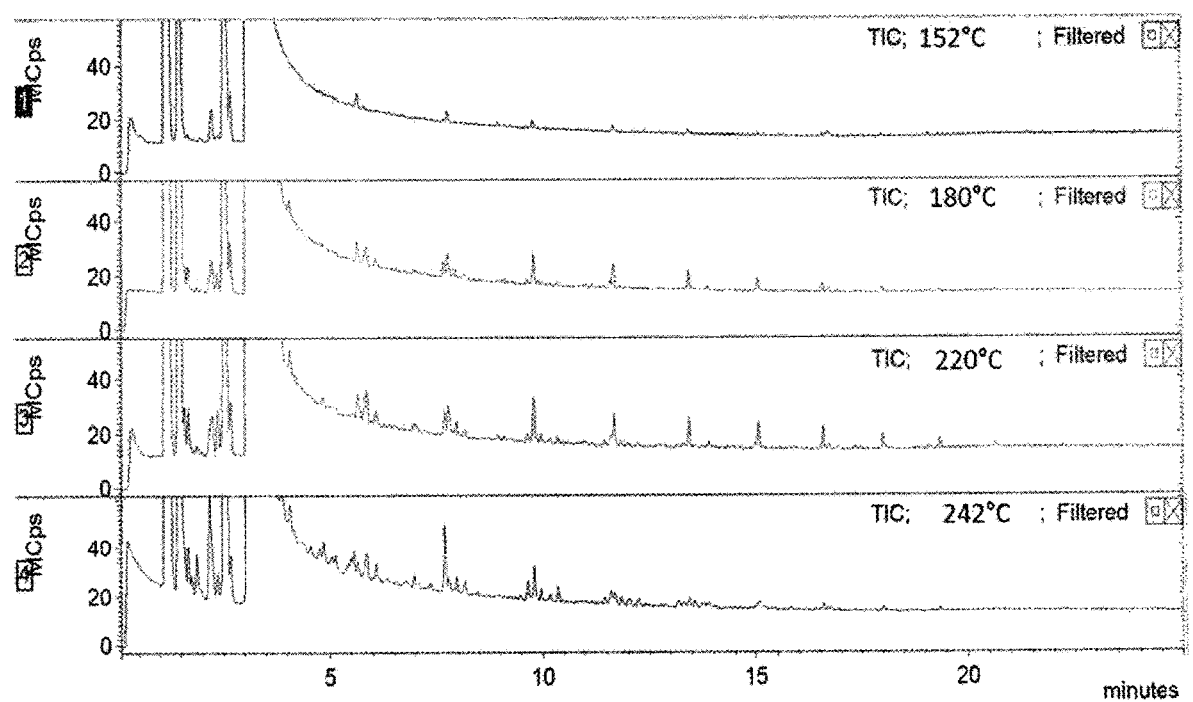

The GC chromatography (FIG. 1A-1B) shows the products obtained from the experiments at different temperatures. $C_3$ to $C_{17}$ alkanes (straight saturated long-chain hydrocarbons) were identified as the main products. In the control sample, there are peaks of solvent, stabilizer in the solvent, water, gases and three contaminations from the solvent. Nothing else was shown in the GC chromatography. This confirms that there is no contamination from nanoparticle catalysts, water or $CO_2$. Trace amount of hydrocarbons start to show up in the sample obtained at the 30° C. While the temperature keeps increasing, the production rate gradually increases. At 125° C. the production rate reaches the maximum. Around the main alkane peaks, there are some sub peaks, which are alkenes and isomers of the main products. After the temperature over this range, the production rate decreases quickly.

Figure 2:
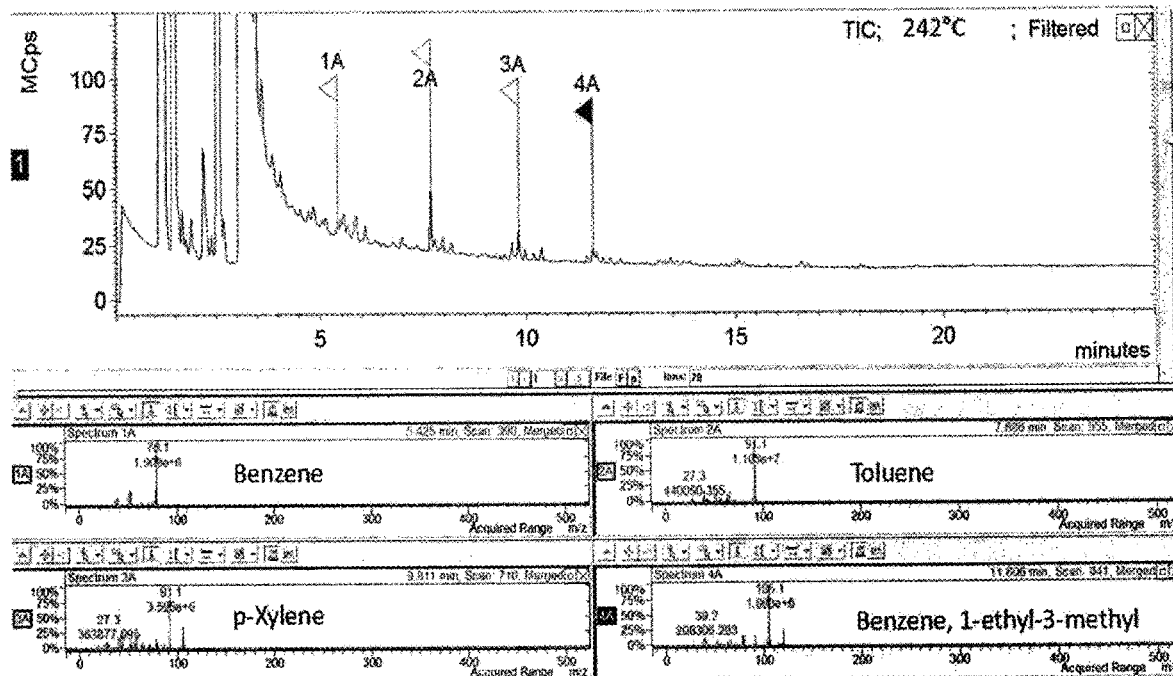
FIG. 2. GC-MS analysis of aromatic hydrocarbons obtained at 242° C.

Further experiment shows that the production rate stays at a low level from 125° C. to 180° C. After 180° C., the production rate increases again, and the products start to change. The proportion of straight saturated hydrocarbons production are decreased and the proportion of unsaturated hydrocarbons are increased. From 200° C. to 300° C., the aromatic hydrocarbons were identified as the main products, as shown in FIG. 2. At higher temperature range, such as from 300° C. to 800° C., the products are the mixture of alkanes, alkenes, alkynes and aromatic hydrocarbons.

Figure 3:
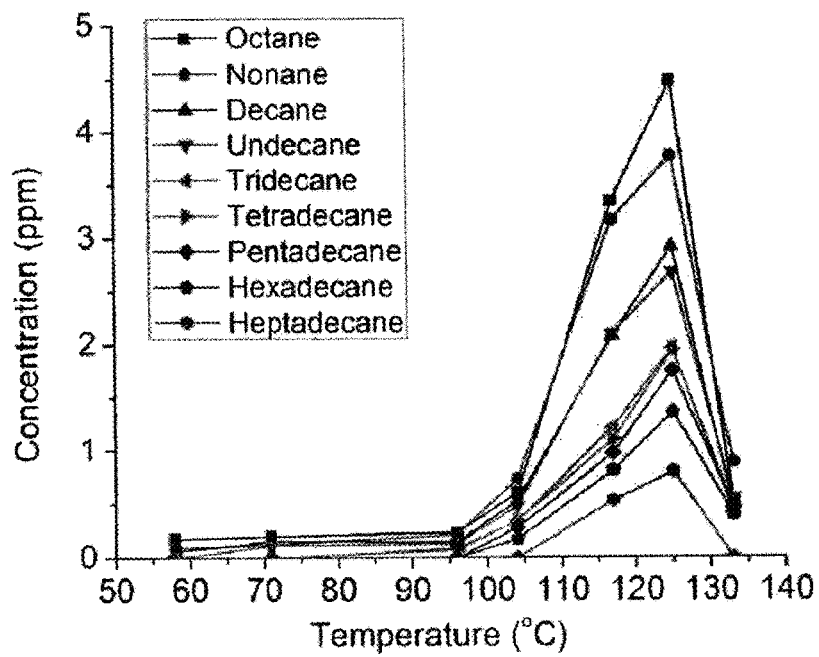
FIG. 3. The production rates of hydrocarbon molecules under different temperatures.

FIG. 3 shows the production rates of hydrocarbon molecules under different temperatures, and it shows that the production rate is not linearly dependent of the temperature. The production rate stays at very low level and slowly increases below 100° C. When the temperature is higher than 100° C., the production rate increases rapidly. All of the products reach the peak rates at 125° C. Octane is the most abundant product. Its production rate increased 25 times from 71° C. to 125° C. and 22 times from 96° C. to 125° C. For hexadecane, the production rate increased 10 times from 96° C. to 125° C.

In this specification and the appended claims, the singular forms "a," "an," and "the" include plural reference, unless the context clearly indicates otherwise. Unless defined otherwise, all technical and scientific terms used herein have the same meaning as commonly understood to one of ordinary skill in the art. Methods recited herein may be carried out in any order that is logically possible, in addition to a particular order disclosed.

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

The invention claimed is:

1. A plasmonic nanoparticle catalyst for producing hydrocarbon molecules by light irradiation, comprising:
   at least one plasmonic provider; and
   at least one catalytic property provider, wherein
   the plasmonic provider and the catalytic property provider are in contact with each other or have distance less than 200 nm, said at least one plasmonic provider and said at least one catalytic property provider are provided in one nanoparticle, and
   the catalytic property provider is selected from the group consisting of Co, Fe, Ru, Rh, Pd, Os, Ir, La, Ce, Cu, Ni, C and oxide, chloride, carbonate and bicarbonate thereof, and molecular composition of the hydrocarbon molecules produced by light irradiation is temperature-dependent.

2. The plasmonic nanoparticle catalyst of claim 1, wherein
said nanoparticle comprises one chemical element as both the plasmonic provider and the catalytic property provider, or alloy of two or more chemical elements each as the plasmonic provider or the catalytic property provider.

3. The plasmonic nanoparticle catalyst of claim 2, wherein
the plasmonic provider is selected from the group consisting of Co, Fe, Al, Ag, Au, Pt, Cu, Ni, Zn, Ti, C and alloys of two or more chemical elements thereof.

4. The plasmonic nanoparticle catalyst of claim 2, wherein
the dimension of the plasmonic nanoparticle catalyst is about 1 nm to about 1000 nm in length, width and height.

5. The plasmonic nanoparticle catalyst of claim 2, wherein
solar-to-chemical efficiency of the plasmonic nanoparticle catalyst is more than 10% at temperatures between about 20° C. to about 800° C.

6. The plasmonic nanoparticle catalyst of claim 1, wherein
the plasmonic provider is selected from the group consisting of Co, Fe, Al, Ag, Au, Pt, Cu, Ni, Zn, Ti, C and alloys of two or more chemical elements thereof.

7. The plasmonic nanoparticle catalyst of claim 6, wherein
the dimension of the plasmonic nanoparticle catalyst is about 1 nm to about 1000 nm in length, width and height.

8. The plasmonic nanoparticle catalyst of claim 6, wherein
solar-to-chemical efficiency of the plasmonic nanoparticle catalyst is more than 10% at temperatures between about 20° C. to about 800° C.

9. The plasmonic nanoparticle catalyst of claim 1, wherein
the dimension of the plasmonic nanoparticle catalyst is about 1 nm to about 1000 nm in length, width and height.

10. The plasmonic nanoparticle catalyst of claim 9, wherein
the shape of the plasmonic nanoparticle catalyst is spherical, cylindrical, polyhedral, 3D cones, cuboidal, sheet, hemispherical, irregular 3D shapes, porous structure or any combinations thereof.

11. The plasmonic nanoparticle catalyst of claim 10, wherein
solar-to-chemical efficiency of the plasmonic nanoparticle catalyst is more than 10% at temperatures between about 20° C. to about 800° C.

12. The plasmonic nanoparticle catalyst of claim 9, wherein
solar-to-chemical efficiency of the plasmonic nanoparticle catalyst is more than 10% at temperatures between about 20° C. to about 800° C.

13. The plasmonic nanoparticle catalyst of claim 1, wherein
solar-to-chemical efficiency of the plasmonic nanoparticle catalyst is more than 10% at temperatures between about 20° C. to about 800° C.

* * * * *